United States Patent
Nishizawa

(10) Patent No.: US 7,517,206 B2
(45) Date of Patent: Apr. 14, 2009

(54) CONTROL SYSTEM OF MOLDING MACHINE

(75) Inventor: Makoto Nishizawa, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 169 days.

(21) Appl. No.: 11/230,463

(22) Filed: Sep. 21, 2005

(65) Prior Publication Data

US 2006/0068049 A1    Mar. 30, 2006

(30) Foreign Application Priority Data

Sep. 24, 2004    (JP) .............................. 2004-277875

(51) Int. Cl.
*B29C 45/76*    (2006.01)
(52) U.S. Cl. .................. 425/143; 425/149; 425/163
(58) Field of Classification Search .................. 425/149, 425/162, 143
See application file for complete search history.

(56) References Cited

U.S. PATENT DOCUMENTS

| 4,802,097 | A  | * | 1/1989 | Tanaka et al. ................ 425/135 |
| 6,649,095 | B2 | * | 11/2003 | Buja ........................... 425/145 |
| 6,925,354 | B2 |   | 8/2005 | Morwald et al. |
| 7,066,725 | B2 |   | 6/2006 | Zufle |
| 7,160,490 | B2 |   | 1/2007 | Hofmann |
| 7,181,311 | B2 |   | 2/2007 | Dachs et al. |
| 2002/0026264 | A1 |   | 2/2002 | Choi |
| 2002/0180080 | A1 |   | 12/2002 | Suzuki et al. |
| 2004/0009252 | A1 | * | 1/2004 | Reichstein et al. .......... 425/143 |
| 2007/0158867 | A1 |   | 7/2007 | Hofmann |

FOREIGN PATENT DOCUMENTS

| AT | 005 752 U1 | 11/2002 |
| DE | 2002 04 360 U1 | 7/2002 |
| DE | 101 62 807 A1 | 7/2003 |
| DE | 102 05 016 A1 | 8/2003 |
| DE | 103 08 386 A1 | 9/2004 |
| EP | 0 493 619 A1 | 7/1992 |
| EP | 1 245 364 A1 | 10/2002 |
| JP | 2002-86531 | 3/2002 |

OTHER PUBLICATIONS

Office Action issued in counterart German Application No. 10 2005 045 529.8-51, dated Sep. 13, 2007, accompanied by an English language translation.

* cited by examiner

*Primary Examiner*—Tim Heitbrink
(74) *Attorney, Agent, or Firm*—DLA Piper LLP US

(57) ABSTRACT

There is disclosed a control system of an injection molding machine in which a controller mounted on a main body side of an injection molding machine comprises a data memory having a memory area to always reflect information regarding a plurality of operation conditions and operation situations corresponding to peripheral devices, and a program to give a desired command to the peripheral devices, and a control section of the peripheral devices and the controller on the injection molding machine main body side comprise a data transmission line to always reflect information regarding the operation conditions and the operation situations, and a transmission control section equipped with a protocol regarding a signal transmitted through the transmission line.

18 Claims, 7 Drawing Sheets

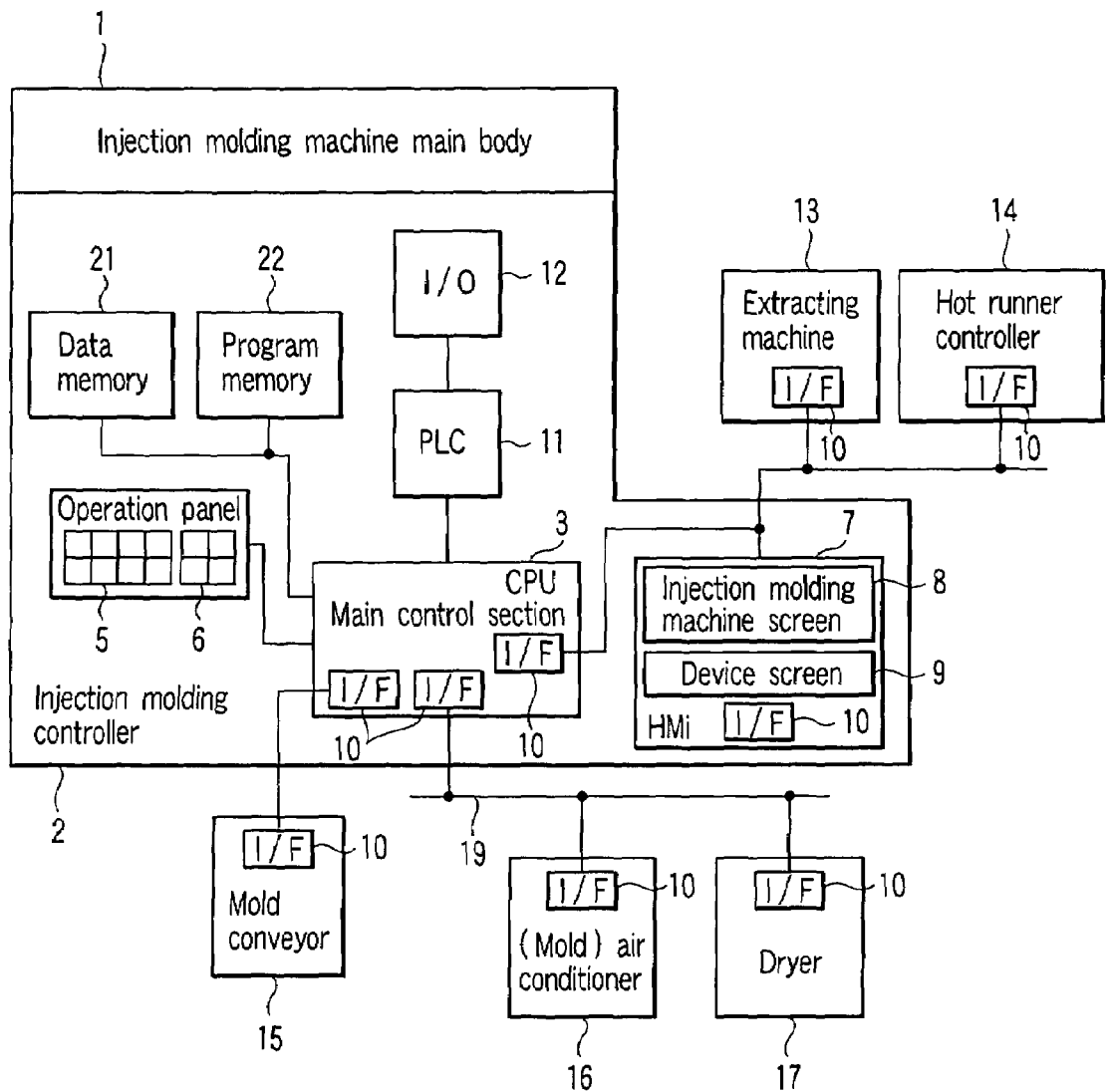
F I G. 1

| Occurrence time | Abnormality history contents | Model of abnormality occurrence |
|---|---|---|
| 10:02 | Material shortage | Conveyor |
| 10:10 | Chucking mistake | Takeout machine |
| 10:12 | Cycle abnormality | Molding machine |
| 10:30 | Injection speed reduction | Main body side |

CONTROL SYSTEM OF MOLDING MACHINE

CROSS-REFERENCE TO RELATED APPLICATIONS

This application is based upon and claims the benefit of priority from prior Japanese Patent Application No. 2004-277875, filed Sep. 24, 2004, the entire contents of which are incorporated herein by reference.

BACKGROUND OF THE INVENTION

1. Field of the Invention

The present invention relates to a control system of a molding machine which shares operation signals between it and peripheral devices thereof with an injection molding machine.

2. Description of the Related Art

Generally, for an injection molding machine for manufacturing various articles by injection molding using resin materials or the like, a plurality of peripheral devices are connected to a main control section of a molding machine main body. As peripheral devices, there are available a takeout robot, a hot runner controller, a dryer, a mold, a temperature controller of a heating cylinder of an injection device, a conveyor, and the like. A program for injection control or clamping control of this injection molding machine is stored beforehand in a main control section.

In the case of operating a plurality of injection molding machines, a control system is used which uses one host computer for work efficiency and easier management to be connected through a communication line to the injection molding machines, and carries out central control by a dedicated program. For example, in a control system shown in FIG. 7, a plurality of injection molding machines that comprise molding machine main bodies, peripheral devices 63a, 63b, ..., 63n, and controllers 62a, 62b, ..., 62n are arranged. For the molding machine main bodies and the peripheral devices 63a, 63b, ..., 63n, a conveying path 67 and mold change mechanisms (not shown) driven and controlled by a conveyor controller 66 are disposed, and molds can be optionally changed.

The controllers 62a, 62b, ..., 62n and the conveyor controller 66 are connected through a bus 65 to a host computer 64. This host computer 64 separately controls the conveyor controller 66 and the controllers 62a, 62b, ..., 62n. For example, running states of the injection molding machines are monitored or linked with mold codes to transmit and supply corresponding molding data to the controllers 62a, 62b, ..., 62n of the injection molding machines.

As such a control system, for example, Jpn. Pat. Appln. No. 2002-86531 discloses a control system which operates an injection molding machine by a host computer disposed at a remote plate by using a network such as LAN or Internet. According to the control system of this Publication No. 2002-86531, various pieces of information are transferred with a mobilephone at a remote place by using a mobilephone and the Internet to realize monitoring, management, and operation control of the injection molding machine.

In the case of constructing a control system which uses the aforementioned host computer as a host computer, a controller of each molding machine main body at a site terminal is controlled by an exclusively created program. Accordingly, facility costs are high, and changing of the program or the system is not easy because of lack of flexibility. In other words, the system cannot be changed corresponding to improvements of each injection molding machine and the peripheral device thereof or higher performance by a new device model, creating a problem that it will be necessary to completely change all the components.

As a management operation and the program become complex, even the host computer can only execute setting at the controller of the site terminal or monitoring of the site terminal, and many control systems have no functions of controlling the peripheral devices thereof.

Generally, there are many arrangements of peripheral devices, and distances are larger between controllers of the peripheral devices for larger systems. Under such a situation, an operator moves to its installation position for each checking of an operation state or operation of the peripheral device, causing not only an increase in wastes of time but also a molding failure which may occur due to resin staying or the like. For example, when a set temperature of a temperature controller installed on an opposite operation side of the injection molding machine is changed, the operator moves away from the controller of the injection molding machine, and cannot instantaneously determine an influence on a molding process by the changed set temperature of the temperature controller.

In this case, the operator returns to the controller position of the injection molding machine to check the molding process. Depending on a result thereof, however, the operator needs to move away to change the setting of the temperature controller again. To eliminate such a manual adjustment, each peripheral device is provided with a function of storing pre-verified molding conditions. However, to access the stored conditions, the operator needs to move to the controller position of each peripheral device.

BRIEF SUMMARY OF THE INVENTION

The present invention provides a control system of a molding machine which is constructed by a plurality of injection molding machines and peripheral devices thereof and which is capable of realizing a working environment at a low cost and with a high working efficiency mainly by the respective injection molding machines and which has an improved productivity.

The present invention provides a control system of an injection molding machine configured by connecting the injection molding machine and a plurality of peripheral devices arranged in the vicinity thereof through communication means, wherein a molding machine controller mounted on a main body side of the injection molding machine comprises a data memory having a memory area to always reflect information regarding operations corresponding to the peripheral devices, and a program to give a desired command to the peripheral devices; the peripheral devices and the molding machine controller comprise a data transmission line to always reflect information regarding conditions of the operations, and a transmission control section equipped with a protocol function regarding a signal transmitted through the transmission line; and the molding machine controller selects an optional peripheral device, executes a remote-control operation based on the information regarding the operation of the peripheral device, and understands an operation situation of the peripheral device.

BRIEF DESCRIPTION OF THE SEVERAL VIEWS OF THE DRAWING

FIG. 1 is a diagram showing a conceptual configuration of an injection molding machine used for a control system of an embodiment regarding a control system of a molding machine of the present invention;

DETAILED DESCRIPTION OF THE INVENTION

Figure 2:
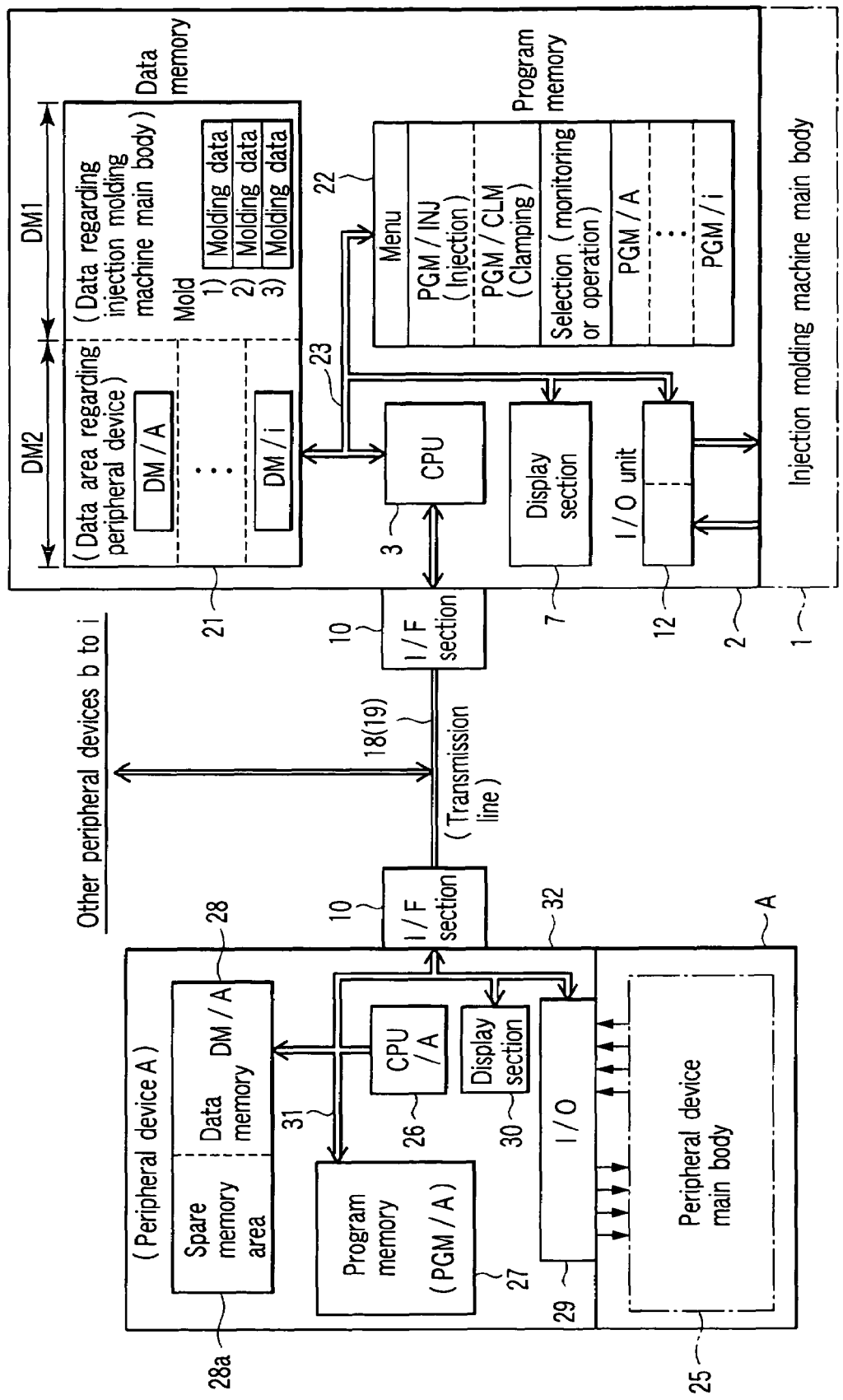
FIG. 2 is a block diagram illustrating a control system of a controller mounted on a main body side of the injection molding machine shown in FIG. 1, and a control section of a peripheral device in detail.

Hereinafter, an embodiment of the present invention will be described in detail with reference to the accompanying drawings.

First, a concept of constructing a control system of a molding machine of the present invention will be described.

An injection molding machine and each peripheral device used for the control system of the molding machine of the present invention are connected through a general communication line such as Ethernet (registered trademark), a USB, serial communication, a MODBUS or the like, and a communication protocol or a control command is defined beforehand to communicate data between each peripheral device and the injection molding machine. The peripheral device and the injection molding machine for which a control program is created in accordance with the definition can communicate data only by making connections through defined communication means, e.g., transfer a file containing information regarding operation conditions. A controller of the injection molding machine contains information regarding an operation or a display screen prestored corresponding to each peripheral device, displays the data of the peripheral device based on the communicated data or gives a control instruction to the peripheral device to perform a remove-control operation. A network (LAN or the like) is constructed by a plurality of injection molding machines (controllers) to perform a remote-control operation for a peripheral device connected to a different injection molding machine. Additionally, a remote-control operation can be performed for the injection molding machine connected from the peripheral device side.

FIG. 1 is a diagram showing a conceptual configuration of an injection molding machine used for a control system of an embodiment regarding a control system of a molding machine of the present invention.

The control system of the present invention roughly comprises an injection molding machine main body 1, a molding machine controller 2, and peripheral devices connected through communication lines 18, 19. This is a configuration example in which as the peripheral devices of the embodiment are presumed to be purchased from different manufacturers, they cannot be unified by a specific protocol, and a transmission system (interface (I/F) section) capable of dealing with various protocols is disposed. Needless to say, however, when communication is possible by a specific protocol, the I/F section is not necessary.

Referring to FIG. 1, the molding machine controller 2 comprises a main control section 3 constituted of a computer (CPU) or the like, an operation panel 4 in which a switch including an injection molding machine operation section 5 and a peripheral device operation section 6 is arranged, a display section 7 containing injection molding machine information 8 and peripheral device information 9 and having a function of displaying various screens and inputting data by touching, a so-called human interface (HMi) function, a data memory 21 for storing data (described later), a program memory 22 for storing a predetermined program, an I/F section 10 for dealing with various protocols, a sequencer PLC 11 for setting an optional setting, and an input/output (I/O) section 12 disposed for an external input for other than the injection molding machine 1 and the peripheral device. The peripheral devices comprise a takeout robot 13 for taking out a molded product from a mold, a hot runner controller 14, a conveyor 15, a temperature controller 16 for a heating cylinder of a mold and an injection device, a dryer 17, and communication lines 18, 19 for electrically connecting the I/F sections 10 of the peripheral devices to the main control section 3 to communicate.

FIG. 2 is a block diagram illustrating a control system of a controller mounted on the injection molding machine main body side of the embodiment, and a control section of the peripheral device. Among components shown in FIG. 2, components similar to those shown in FIG. 1 are denoted by similar reference numerals, and detailed description thereof will be omitted. A relation between, e.g., one peripheral device A among the plurality of peripheral devices, and the molding machine controller 2 will be described.

As described above, the molding machine controller 2 comprises the data memory 21 and the program memory 22 of the molding machine side, each of which is connected through the internal bus 23 to the main control section 3. The I/O section 12 is connected to the injection molding machine main body 1 through buses 24a, 24b to transfer signals therewith.

The peripheral device A comprises a peripheral device main body 25 and a control section 32. The control section 32 comprises a central processing unit (CPU/A) 26, a program memory 27 for storing a peripheral device side program (PGM/A), a data memory 28 for storing peripheral device side data (DM/A) containing operation conditions, a display section 30 for displaying operation conditions and an operation state of the peripheral device A as pieces of information regarding an operation, and a peripheral device side I/O section 31 for communicating with the peripheral device main body 25. The display section 30 has a function identical to that of the display section 7 in principle. Depending on a peripheral device, however, it may not comprise any soft input functions. The central processing unit (CPU/A) 26 is connected through an internal bus to the program memory 27 and the data memory 28 to transfer signals therewith. The molding machine controller 2 and the peripheral device A are connected to each other through a communication line 18 (19) in which each (I/F) section 10 thereof becomes a transmission line, and communication such as control signal or data transfer is carried out based on a unique protocol.

The program memory 27 of the peripheral device A side prestores a command program (PGM/A) for instructing an operation at the peripheral device main body 25. The data memory 28 stores data (DM/2) regarding pluralities of operation conditions, states and the like at the peripheral device main body 25 [or file containing information regarding operation conditions]. The central processing unit (CPU/A) 26 reads relevant or instructed data from the data memory 28 based on the command program, and issues a commands in accordance with the operation conditions to operate the peripheral device main body 25. The data memory 28 includes a spare memory area 28a.

The program memory 22 of the molding machine controller 2 stores a menu program 22a, an injection program PGM/INJ 22b, a clamping program PRG/CLM 22c, a selection program 22d for executing touch-inputting to select monitoring/operation of the display section 7, and a command program (PGM/A) of the peripheral device A side. The embodiment has been described by way of the peripheral device A alone. Actually, however, command programs PGM/A, . . . , PGM/i are stored for a plurality of peripheral devices A to i.

The command program (PGM/A) stored in the program memory 22 is identical to the command program (PGM/A) of the program memory 22 of the peripheral device A, and these programs are stored to be linked with each other. That is, when the main control section 3 of the injection molding machine main body 1 reads this command program (PGM/A) from the program memory 22 to display it on the display section 7, thereby giving an instruction of touch-inputting, it means issuance of a command to the central processing unit (CPU/A) 26 of the peripheral device A side, and the peripheral device A is driven in accordance with the command. When one of the CPU 3 and the CPU/A 26 is used to update or correct the command program (PGM/A), the data are rewritten in both of the program memories 22 and 27, whereby the same command program (PGM/A) is always stored.

The data memory 21 of the molding machine controller 2 comprises at least two memory areas to store data (DM/1) regarding the injection molding machine main body 1 and data (DM/A) regarding the peripheral device A. The data (DM/A) regarding the peripheral device A is identical to the data (DM/A) stored in the data memory 28 of the peripheral device side, and these are always linked with each other. That is, when the data (DM/A) of the data memory 28 is rewritten at the central processing unit (CPU/A) 26 of the peripheral device A side, the data (DM/A) stored in the data memory 21 of the molding machine controller 2 is also rewritten. Accordingly, irrespective of whether the operator operates the peripheral device A or not, memory contents of the peripheral device A are displayed on the screen of the display section of the molding machine controller 2. In other words, monitoring is enabled. The embodiment has been described by way of the peripheral device A alone. Actually, however, data DM/A, . . . , DM/i are stored for the plurality of peripheral devices A to i.

With this configuration, according to the control system of the embodiment, operation conditions, states and the like set in the plurality of peripheral devices connected to the injection molding machine can be understood on the injection molding machine side, and remote control can be executed by the molding machine controller. As the injection molding machine understands the command program and the data regarding the operation conditions or the like of the peripheral device, an operation situation can always be monitored. Thus, the operator can monitor and remote-control the peripheral device even without moving to its installation place.

Next, a modified example of the embodiment will be described.

Figure 3:
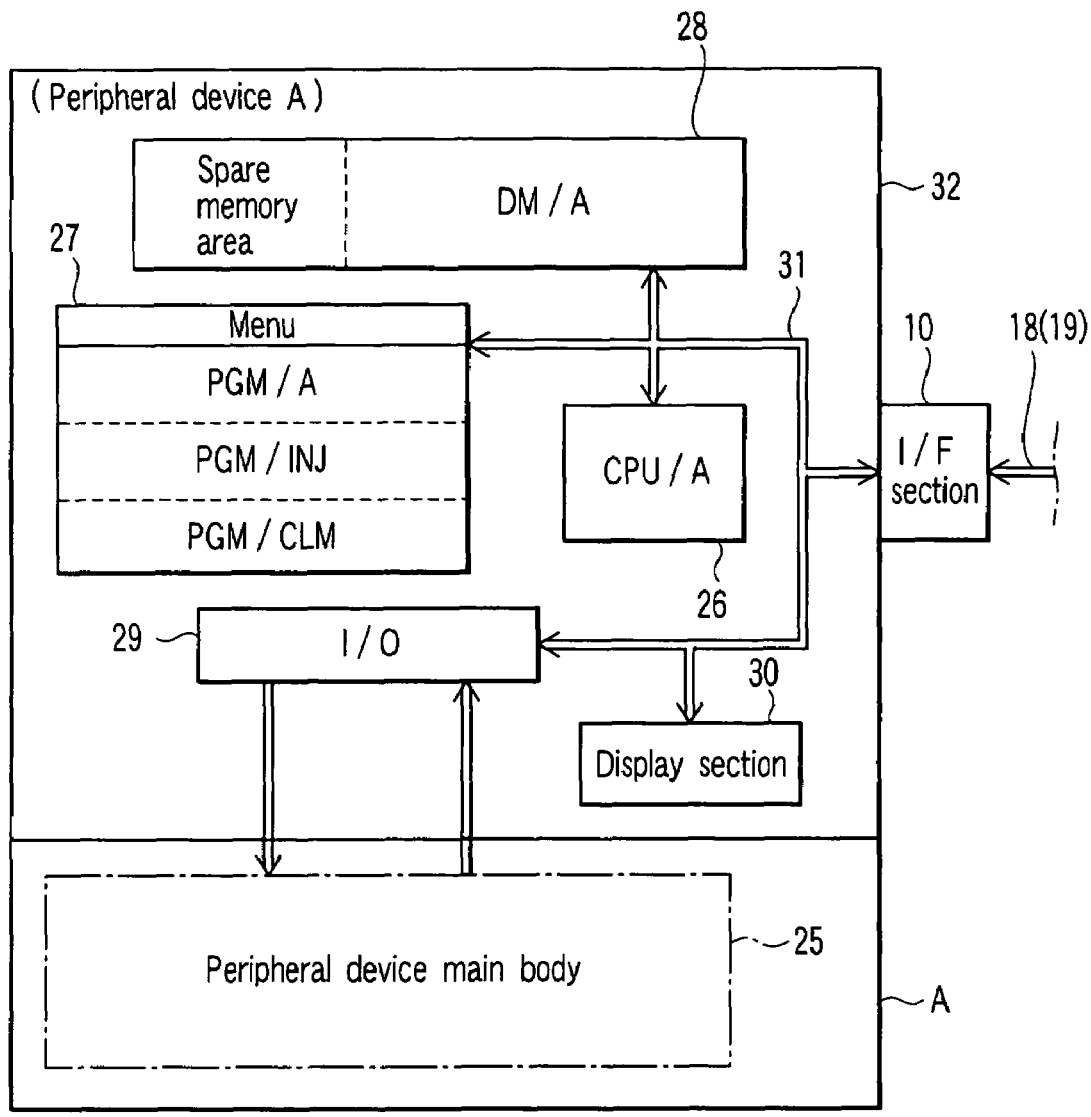
FIG. 3 is a diagram showing a modified example of the embodiment.

As shown in FIG. 3, according to the modified example, a program memory 27 of a peripheral device A side prestores an injection program PGM/INJ 22a and a clamping program PRG/CLM 22b of a molding machine controller 2 side. These programs are displayed on a display section 30 or the like to be selected/specified by an operator.

Figures 4A, 4B:
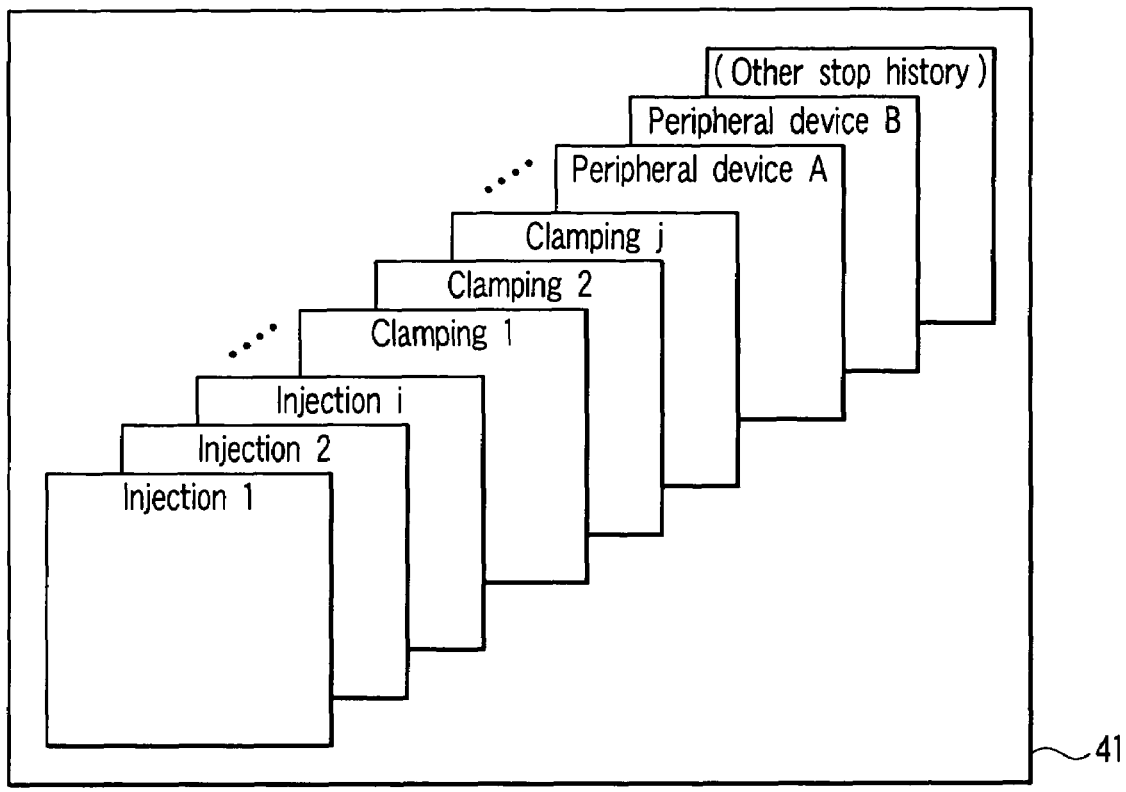
FIG. 4A is a diagram showing an example of a screen of a display section 7 of a molding machine controller 2.
FIG. 4B is a diagram showing an example of an abnormality history sheet.

FIG. 4A is a diagram showing an example of a screen of a display section 7 of the molding machine controller 2. On a screen 41, sheet groups of forming conditions or the like are displayed for injections 1 to i, and clampings 1 to j. Stop history sheets of peripheral devices A, B are newly added to such a display to be displayed. FIG. 4B is a diagram showing an example of an abnormality history sheet 42 in which abnormality history of stops caused by abnormalities of the injection molding machine main body and the peripheral device is time-sequentially made. Items in this abnormality history sheet 42 includes, e.g., occurrence time, abnormality history contents, a model of abnormality occurrence, and the like. There are additional items such as processing contents and processing time.

As described above, the display screen of the display section 7 comprises a touch panel, and functions as a switch (soft switch) by touching a displayed mark or the like with a finger. For example, in FIG. 4B, the sheet of the injection 1 is displayed first on the screen. When the sheet of the peripheral device A is touched, the sheet of peripheral device A is displayed first on the screen. By further touching a selection mark such as a maxim display mark (not shown), the sheet of the peripheral device A can be expanded to be displayed on the full surface of the screen.

Figure 5A:
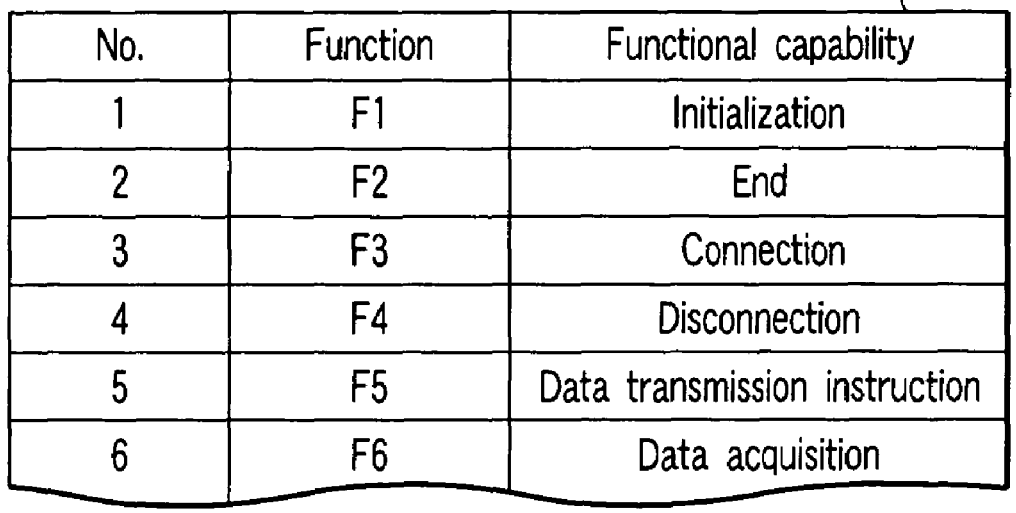
FIG. 5A is a diagram showing an instruction sheet regarding instructions from the molding machine controller 2 side to a takeout robot 13.
Figure 5B:
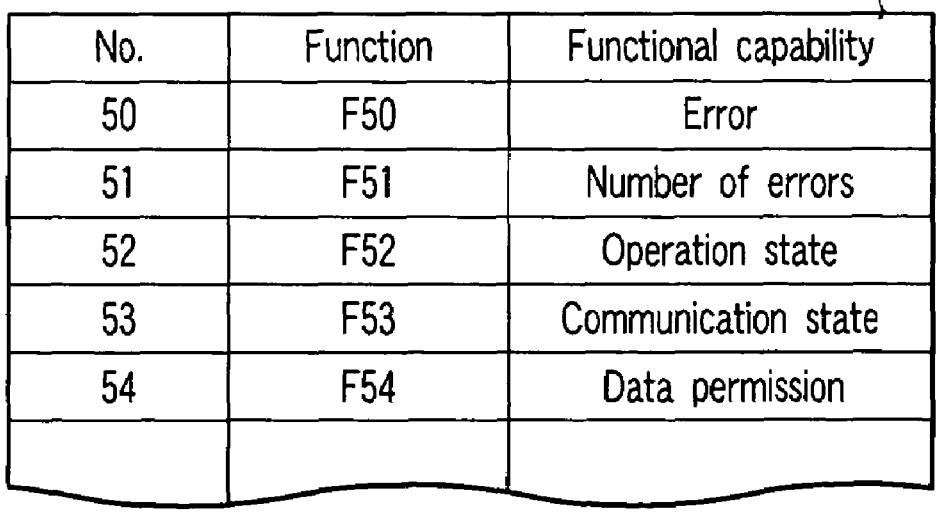
FIG. 5B is a diagram showing a state sheet of the takeout robot side.

Each of FIGS. 5A and 5B shows a screen sheet of functions and functional capabilities thereof when the peripheral device A is applied to a takeout robot 13 for taking out a created molded article. FIG. 5A shows an instruction sheet 43 regarding an instruction from the molding machine controller 2 to the takeout robot 13, and FIG. 5B shows a state sheet 44 of the takeout robot 13 side. These functions Fx comprise data such as return values or arguments for the functional capabilities. Needless to say, a relation between the functions Fx and the functional capabilities is not fixed.

Figure 6:
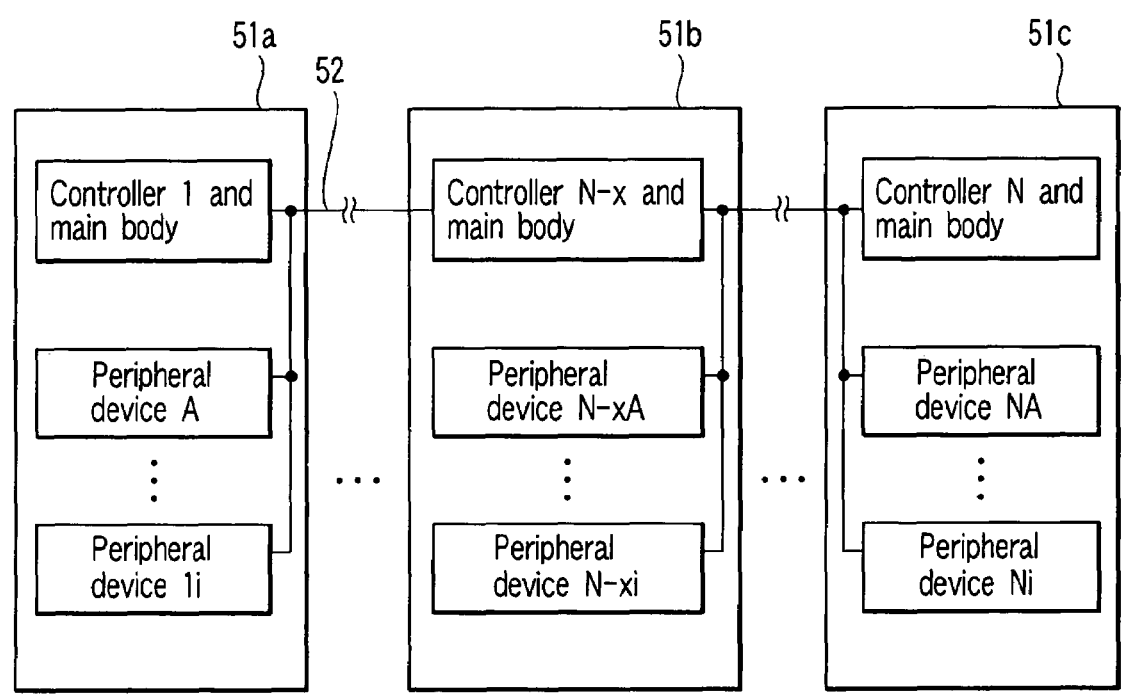
FIG. 6 is a diagram showing a configuration example in which the embodiment or the modified example is applied to a LAN.
Figure 7:
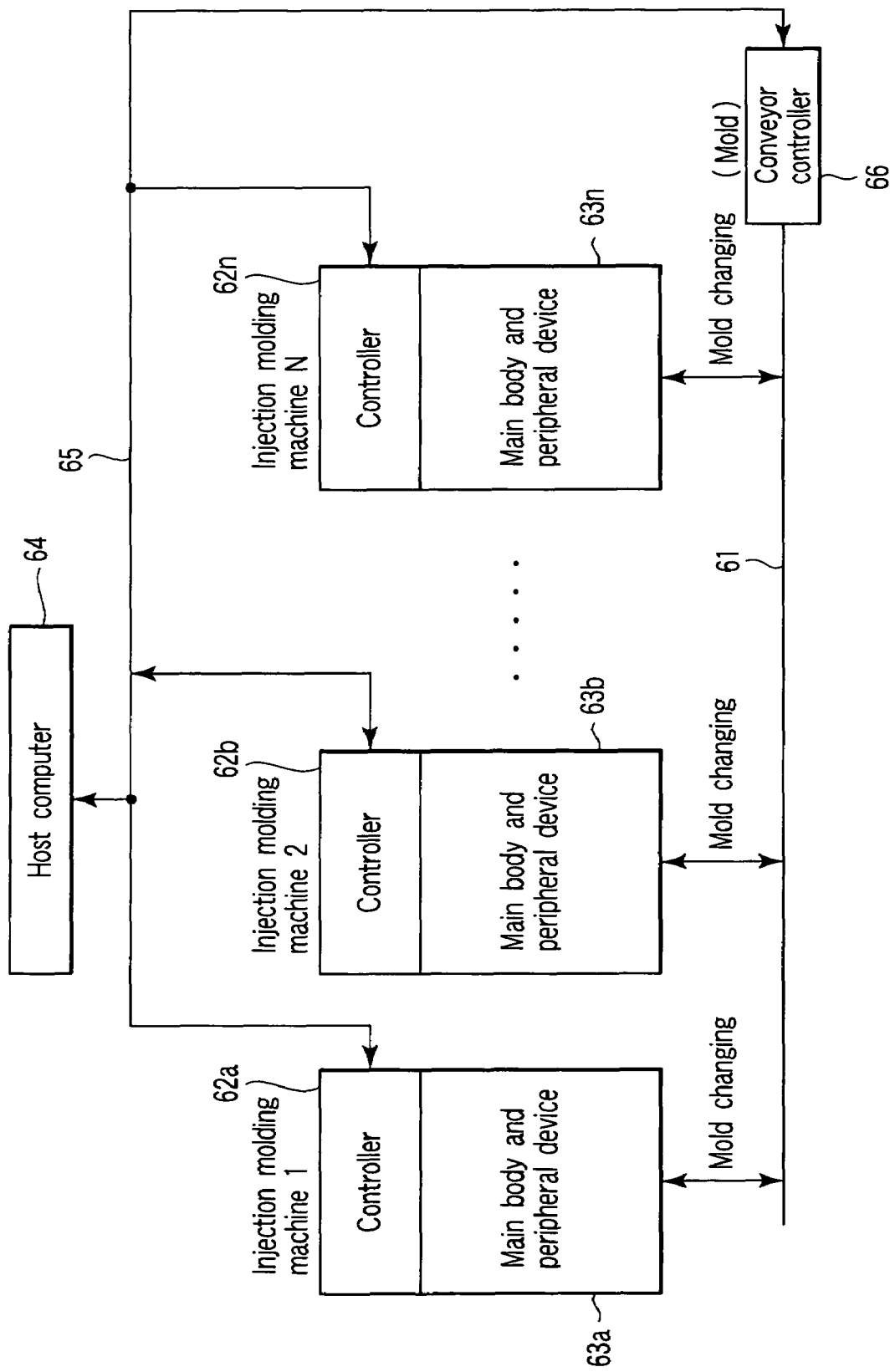
FIG. 7 is a diagram showing an example of a conventional control system of an injection molding machine.

FIG. 6 shows an example in which a plurality of injection molding machines having a configuration of the embodiment or the modified example are used to constitute a peer-to-peer type network by a local area network (LAN).

The peer-to-peer network has a simple configuration in which a plurality of injection molding machines 51a, 51b, and 51c are serially connected through one bus 52 which becomes an information transmission line. This network can be easily and inexpensively constructed as a host computer (server) is not necessary.

As described above, the control system of the molding machine of the present invention controls all the devices only by operating the injection molding machine controller to check the operation situation or operate each peripheral device, whereby the movement of the operator can be eliminated.

Even when an abnormality occurs in any one of the peripheral devices, as the devices are controlled en bloc on the molding machine controller, the operator can check the peripheral device of the abnormality occurrence and its cause on the spot (before the molding machine controller).

Besides, a failure diagnosis can be made for the entire injection molding machine system. For example, it is possible to instantaneously determine whether a cycle abnormality that has conventionally occurred at the injection molding machine controller is caused by a chucking mistake of the takeout robot or a material conveying failure on the spot.

Concerning molded article quality monitoring, in addition to information on pressure/speed/position/temperature monitored by the injection molding machine controller, pieces of information of each peripheral device such as a temperature of the mold, a temperature of cooling water, a drying temperature of a resin, and the like can be correlated, and thus more detailed quality analysis is possible.

Enlargement of the injection molding machine requires shortening of operator's operation time during mold preparation or at the time of starting molding. For example, when the mold is mounted or a chucking adjustment of the takeout robot is made, the operator may move away from the controller position of the injection molding machine to the opposite operation side. In this position, information on a position of a platen of the injection molding machine or the takeout robot cannot be obtained to hinder various operations. Thus, if the control system of the present invention is used, for example, by arranging the controller of the takeout robot on the opposite operation side, information checking or an operation of the injection molding machine can be executed by the controller of the takeout robot to increase working efficiency.

Even when the controller of the takeout robot is positioned on the takeout robot side, there is no problem because a starting operation of the takeout robot can be performed by the controller of the injection molding machine. By connecting the plurality of injection molding machines through the controllers, expandability can be further increased. The operator can monitor not only the system but also other molding systems only by being present before one injection molding machine.

Because of low costs of the peripheral devices, even when no display device is disposed or when simple input/output means such as a key switch or an LED alone is disposed, it is possible to monitor status information in the control section of the peripheral device on the controller on the injection molding machine main body side.

According to the control system of the molding machine of the embodiment configured as described above, the controller mounted on the injection molding machine main body side comprises the data memory which has a memory area to always reflect the pluralities of operation conditions and states corresponding to the peripheral devices, and the program memory which stores a command program identical to the operation command program for giving an operation command to the central processing unit (CPU/A) disposed in the control section of the peripheral device, and information regarding the operation of the transmission control section equipped with a protocol is transferred to enable remote-control operation.

According to the present invention, it is possible to provide a control system of a molding machine which comprises a plurality of injection molding machines and peripheral devices thereof and in which an inexpensive working environment of high working efficiency is realized mainly by each injection molding machine, and productivity is improved.

Furthermore, it is possible to construct an inexpensive control system of a molding machine without using a host computer, a production site terminal, a dedicated program or the like. The operator can monitor or operate the peripheral devices by using the molding machine controller. Thus, time for molding preparation or dealing with troubles can be shortened to contribute to an increase in productivity.

What is claimed is:

1. An injection molding system, comprising:
   an injection molding machine;
   a plurality of peripheral devices connected to the injection molding machine via communication lines for mutual communications, each of the peripheral devices arranged in proximity to the injection molding machine and configured to perform at least one manufacturing process; and
   a molding machine controller mounted on a main body side of the injection molding machine, the molding machine controller including a data memory having a memory area to continuously reflect information regarding operations corresponding to each of the peripheral devices, and a program to give a desired command to each peripheral device,
   the peripheral devices and the molding machine controller configured to each include a transmission control section equipped with a protocol function relating to information regarding operating conditions of the peripheral devices and the molding machine controller operations, the peripheral devices and the molding machine controller connected via the communication lines to continuously reflect the information; and
   wherein the molding machine controller and at least one peripheral device are connected to:
      permit the molding machine controller to remotely control the at least one peripheral device based on information relating to operations read out from the data memory,
      permit the at least one peripheral device to remotely control the molding machine controller based on information relating to operations read out from the data memory, and
      monitor operating conditions of the at least one peripheral device from the at least one peripheral device or the molding machine controller.

2. The injection molding system according to claim 1, wherein a program memory in a control section of each peripheral device stores command programs of an injection device and a clamping device which are stored in a program memory of the controller on the injection molding machine main body side.

3. An injection molding system comprising:
   a plurality of injection molding machines;
   a plurality of groups of peripheral devices, each group connected to one of the injection molding machines, respectively, via communication lines for mutual communications, each of the peripheral devices being arranged in proximity to a corresponding injection molding machine and configured to perform at least one manufacturing process; and
   a plurality of molding machine controllers, one mounted on a main body side of a corresponding one of the injection molding machines, the molding machine controllers each including a data memory having a memory area to continuously reflect information regarding operations corresponding to each of the corresponding peripheral devices, and a program to give a desired command to each corresponding peripheral device, wherein
   the peripheral devices and the corresponding molding machine controller are configured to each include a transmission control section equipped with a protocol function relating to information regarding operating conditions of the peripheral devices and the corresponding molding machine controller operations, the peripheral devices and the corresponding molding machine controller being connected via the communication lines, and
   the plurality of molding machine controllers are connected via the communication line, and remote control of at least one peripheral device connected to one injection molding machine controller is executed by another molding machine controller.

4. The injection molding system according to claim 2, wherein molding machine controllers of a plurality of injection molding machines are connected via the communication lines, and remote control of the at least one peripheral device connected to one optional injection molding machine controller is executed by another molding machine controller.

5. The injection molding system according to claim 1, wherein the plurality of peripheral devices are connected to the injection molding machine via the communication lines, the plurality of peripheral devices including a takeout robot, a temperature controller, a dryer, a hot runner controller, a conveyor or a mixer, or any combination of two or more thereof.

6. The injection molding system according to claim 2, wherein the plurality of peripheral devices are connected to the injection molding machine via the communication lines, the plurality of peripheral devices including a takeout robot, a temperature controller, a dryer, a hot runner controller, a conveyor or a mixer, or any combination of two or more thereof.

7. The injection molding system according to claim 1, further comprising a memory for storing abnormality information regarding an abnormality and/or an operation or a message generated in each peripheral device together with occurrence history of information regarding abnormalities in the injection molding machine in the controller of the injection molding machine, and a display section for displaying the information or message.

8. The injection molding system according to claim 2, further comprising a memory for storing abnormality information regarding an abnormality and/or an operation or a message generated in each peripheral device together with occurrence history of information regarding abnormalities in the injection molding machine in the controller of the injection molding machine, and a display section for displaying the information or message.

9. The injection molding system according to claim 1, wherein a file containing information regarding operation conditions of each peripheral device recorded by the peripheral device is correlated with a file containing information regarding operation conditions of the injection molding machine, and the file containing the information regarding the operation conditions of each peripheral device is set by remote control in accordance with an instruction from the controller of the injection molding machine.

10. The injection molding system according to claim 2, wherein a file containing information regarding operation conditions of each peripheral device recorded by the peripheral device is correlated with a file containing information regarding operation conditions of the injection molding machine, and the file containing the information regarding the operation conditions of each peripheral device is set by remote control in accordance with an instruction from the controller of the injection molding machine.

11. The injection molding system according to claim 1, further comprising a memory and a display for storing and displaying temperature, pressure, position, speed and time data calculated by each peripheral device connected to the injection molding machine on the controller side of the injection molding machine.

12. The injection molding system according to claim 2, further comprising a memory and a display for storing and displaying temperature, pressure, position, speed and time data calculated by the each peripheral device connected to the injection molding machine on the controller side of the injection molding machine.

13. The injection molding system according to claim 1, wherein a setting change and/or an operation of the at least one peripheral device connected to the injection molding machine is executed by remote control on the controller of the injection molding machine.

14. The injection molding system according to claim 2, wherein a setting change and/or an operation of the at least one peripheral device connected to the injection molding machine is executed by remote control on the controller of the injection molding machine.

15. The injection molding system according to claim 1, wherein operation conditions or an operation situation of the injection molding machine side is displayed by remote control on a display device of the at least one peripheral device connected to the injection molding machine.

16. The injection molding system according to claim 2, wherein operation conditions or an operation situation of the injection molding machine side is displayed by remote control on a display device of the at least one peripheral device connected to the injection molding machine.

17. The injection molding system according to claim 1, wherein a setting change or an operation of the injection device main body is executed by remote control on a control section of the at least one peripheral device connected to the injection molding machine.

18. The injection molding system according to claim 2, wherein a setting change or an operation of the injection device main body is executed by remote control on a control section of the at least one peripheral device connected to the injection molding machine.

* * * * *